United States Patent

[11] 3,622,484

| [72] | Inventor | Leo P. Cawley |
| | | 550 N. Hillside, Wichita, Kans. 67208 |
| [21] | Appl. No. | 9,625 |
| [22] | Filed | Feb. 9, 1970 |
| [45] | Patented | Nov. 23, 1971 |

[54] SAMPLE PLACING METHOD
4 Claims, 6 Drawing Figs.

[52] U.S. Cl. ........................................... 204/180
[51] Int. Cl. ........................................... B01k 5/00
[50] Field of Search ........................................... 204/180 G, 299

[56] References Cited
UNITED STATES PATENTS

| 3,317,418 | 5/1967 | Zec | 204/299 |
| 3,360,454 | 12/1967 | Sahmel | 204/299 |
| 3,428,547 | 2/1969 | Zec | 204/299 |

Primary Examiner—John H. Mack
Assistant Examiner—A. C. Prescott
Attorney—John H. Widdowson ABSTRACT: This invention is a method of inserting serum specimen into a stabilizing media gel as used in preparing samples for electrophoresis and immunoelectrophoresis processes. More particularly, the method of this invention comprises placing the serum specimen on the edge of a blade, inserting the blade into the stabilizing media gel, thereby removing the serum from the blade and depositing the serum in the stabilizing media gel in the formed slit, and removing the blade from the gel.

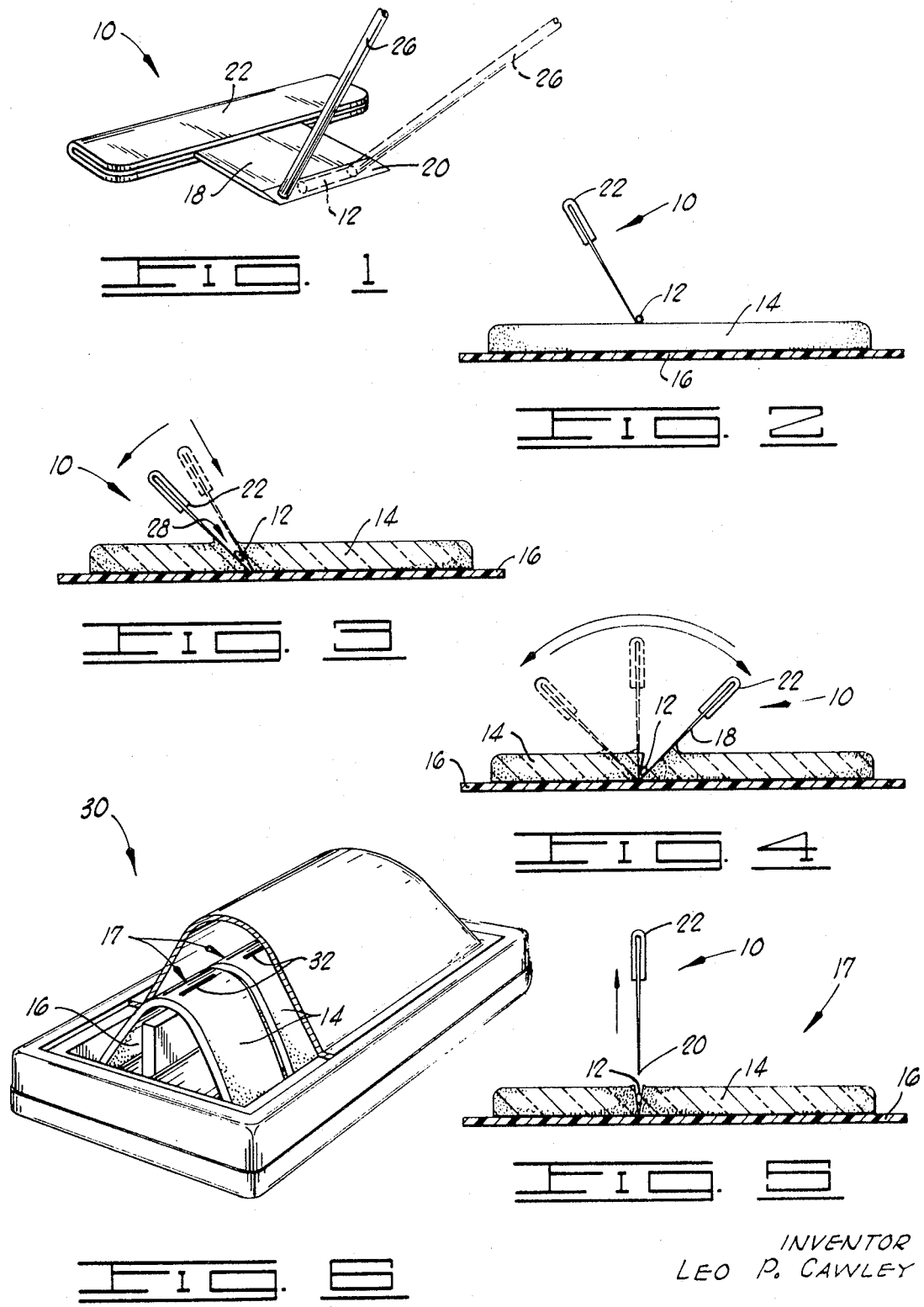

SAMPLE PLACING METHOD

Several methods are known in the prior art to place serum samples in a stabilizing media gel held on a slide or similar device for use in electrophoresis and immunoelectrophoresis processes. However, these prior art methods require the stabilizing media gel to have a cavity of some sort previously formed therein to receive the serum sample. This requires forming a cavity in the stabilizing media gel when it is originally formed on the slide or strip, or making a cavity therein after the stabilizing media gel is formed on the slide, either of which are time consuming and tedious operations, with accuracy difficult to obtain.

In a preferred specific embodiment of this invention, a method of placing the serum samples in the stabilizing media gel is provided which does not require formation of a cavity in the stabilizing media gel prior to inserting the sample. The stabilizing media gel is preferably formed on the slide in a substantially uniform layer. The serum sample is placed along the edge of a thin blade, and that blade edge is inserted into the stabilizing media gel, pivoted back and forth about the blade edge; then the blade edge is removed from the stabilizing media gel leaving the sample therein. Thus, simultaneously the slit or pocket is formed in the gel along with depositing the serum sample in same and in the gel for subsequent electrophoretic treatment.

One object of this invention is to provide a method of placing serum samples for electrophoretic treatment which overcomes the aforementioned disadvantages of the prior art methods.

Still another object of this invention is to provide a method of placing serum samples for electrophoretic treatment which is acceptable and accurate for placing of very small quantities of serum.

Still another object of this invention is to provide a method of placing serum samples for electrophoretic treatment which does not necessitate the use of stabilizing media gel having a preformed cavity therein.

Still another object of this invention is to provide a method of placing serum samples in a stabilizing media gel for electrophoretic treatment which is easily done, relatively rapid and efficient. relatively Various other objects, advantages, and features of the invention will become apparent to those skilled in the art from the following discussion, taken in conjunction with the accompanying drawings, in which:

FIG. 1 is a perspective view of the blade and portion of the serum sample dispenser positioned on the edge thereof and shown dotted dispensing a sample;

FIG. 2 is a side elevation of the blade and coated sample placed on the surface of the stabilizing media gel prior to insertion;

FIG. 3 is a cross-sectional view of the stabilizing media gel and slide or strip with the blade and sample shown in outline as initially inserted and shown as initially pivoted;

FIG. 4 is a cross-sectional view of the stabilizing media gel and strip showing the blade in positions of pivoting about its edge;

FIG. 5 is a cross-sectional view of the stabilizing media gel and slide showing the blade removed from the stabilizing media gel and the serum sample therein; and FIG. 6 is a perspective view of a typical electrophoresis device having a portion of the cover thereof removed with strips having stabilizing media gel with serum samples positioned therein.

The following is a discussion and description of preferred specific embodiments of the new sample placing method of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIGS. 1 to 5, the steps of the method of this invention are illustrated thereby; the blade, indicated at 10, has a serum specimen, indicated at 12, on its edge prior to insertion in the stabilizing media gel 14 which is supported on the slide strip 16. When the serum specimen 12 is placed in the stabilizing media gel 14, it is generally referred to as an electrophoretic sample 17.

The blade 10 preferably used in placing the sample of serum preferably has a rectangular-shaped shank portion 18, edge portion 20 and an extended handle or gripping portion 22. The shank 18 and edge 20 portions of the blade 10 are preferably thin in cross-sectional dimension; the edge portion 20 being preferably linearly straight and sharp. The stabilizing media gel 14 is preferably an optically clear gel substance when at room temperature. More preferably, the stabilizing media is agarose or agar gel, materials which are commonly used for electrophoresis and immunoelectrophoresis processes. The slide strip 16 is preferably a sheet of pliable plastic film material which is flexible and easily coated with the stabilizing material gel 14. Also, glass and metal have been found satisfactory material for the slide strip. The slide strip 16 coated with the stabilizing media gel 14 in a layer by means of spraying, molding or dropping the gel 14 thereon and spreading same to a uniform layer while the gel is in a heated liquid condition, then cooled to its normal jellied condition.

Initially one side of the edge 20 is coated with the serum 12 from a syringe, microcapillary tube or similar device as partially indicated at 26. With the serum 12 placed along the edge 20 of the blade 10, the blade 10 is positioned inclined along the surface of the stabilizing media gel 14 with the serum 12 above the blade edge. The edge 20 of the blade 10 is preferably pushed into the stabilizing media gel 14 along an incline like that shown in FIG. 2, then pivoted downward about the edge 20; this opens a space 28 within the stabilizing media gel 14 for the serum 12. After the space 28 is opened, the blade 10 is pivoted back and forth about the edge 20 wiping the serum 12 from the blade 10 with the gel, as shown in FIG. 4. The stabilizing media gel 14 is resilient in nature and easily separated by movement of the blade 10; it slides on the shank portion 18 of the blade 10 when pivoted. Once the serum sample has been substantially wiped from the blade 10, it is removed from the stabilizing media gel 14 by being lifted vertically, as is shown in FIG. 5.

After serum specimen 12 is placed in the stabilizing media gel 14, the electrophoretic sample 17 is placed in an electrophoretic cell, generally indicated at 30. The electrophoretic sample 17 is placed in the electrophoretic cell 30 shown in a generally semicircular position with the stabilizing media gel 14 outward. The position of the serum specimen 12 is indicated at 32 on the crown portion of the sample 17. Of course, a sample on a nonflexible strip such as glass would be used in a cell to accommodate such.

In practice of the method of this invention, wherein producing the gel slit or pocket and inserting therein the serum sample is done simultaneously, it is seen that same provides accurate and rapid insertion of serum specimens 12 in the stabilizing media gel 14 of an electrophoretic sample 17. The blade 10 is used to form a cavity, in the stabilizing media gel 14 and place the sample therein simultaneously.

EXAMPLE

In the following is set forth an example of the method of the invention. It is to be understood that the equipment, compositions, sizes, amounts, etc., set forth are not to unduly limit the scope of the invention.

The following equipment and reagents were used in conducting the tests:

1. The clear and flexible plastic film employed was Cronar Film P–40B, 35 mm., unperforated, 0.004 in. thick, such available from E. I. duPont deNemours & Company (Inc.), Wilmington Del.

2. A Hamilton syringe, 1 ul. to 10 ul. capacity, was used to place the serum sample on the blade.

3. An electric hot plate was used in preparing the gel, which was mixed in a common beaker with a pipette used to add the buffer.

4. Barbital buffer was used, pH 8.6, ionic strength 0.075 (supplier Fisher Scientific Company, Pittsburg, Pa., in unit packages). One package of the buffer was dissolved in 1,500 ml. of distilled water.

5. The agarose used was obtained from Bausch & Lomb, Inc., Rochester, N.Y.

6. A blade like that shown in FIG. 1 of the drawings was made from a common single edge stainless steel razor blade by reducing the width of the blade portion, by cutting same away to a size of approximately 2. cm.

A standard agarose buffer mixture was employed specifically 250 mg. agarose and 50 ml. barbital buffer. The buffer was added to the agarose by measuring same in the pipette, and the resulting mixture was brought to a boil on the hot plate while gently stirring same periodically. The beaker was covered in between to prevent undue evaporation.

The specific procedure followed was:

1. The clear plastic film was cut into a 15 cm. length. It was marked using a liquid tip pen on the side opposite the gel coating side for point of origin of the serum sample to be used, and the usual anodic migration point.

2. The other side of the plastic film strip was coated with 5 ml. of the hot buffered agarose solution, which was spread evenly over substantially the entire surface of the strip.

3. The resulting coated strip was allowed to stand about 8 minutes at room temperature and the buffered gel hardened thereon.

4. The serum sample was placed on the surface of the edge of the blade with the syringe substantially along the entire edge of the blade in the manner depicted in FIG. 1 of the drawings.

5. Utilizing the blade with the serum sample thereon the gel-coated strip was inoculated by inserting the blade into the gel coat and pivoting the blade about its edge as depicted in FIGS. 2–6, inclusive, of the drawings, and discussed in detail hereinbefore.

The serum sample was thereby wiped from the edge of the blade by the gel and remained in the slit or pocket formed in the gel coat resulting from inserting the blade therein.

The resulting inoculated strip was treated electrophoretically in a standard electrophoretic cell, stained in the usual manner, scanned by the standard procedure with standard analytrol equipment, and the strip produced a perfect result.

Another strip prepared in the same manner with the same materials was inoculated with another serum sample. It was treated electrophoretically, stained, and scanned in the same manner, and with the same equipment, again giving a perfect result.

As will be seen from the foregoing discussion and description of the sample placing method invention, a relatively inexpensive, fast, reliable and accurate method has been provided to place serum specimens in a stabilizing media gel for electrophoretic tests, that can easily be done by hand operation. The method is easily followed and eliminates the necessity of having the stabilizing media molded to accept small specimens.

While the invention has been described in conjunction with preferred specific embodiments thereof, it will be understood that this description is intended to illustrate and not limit the scope of the invention, which is defined by the following claims.

I claim:

1. A method of inserting a serum specimen in a stabilizing media gel, comprising:
    a. placing said serum specimen on the surface of an edge of a blade, coating same,
    b. inserting said blade having the resulting coating into said stabilizing media gel,
    c. moving said coated blade in said stabilizing media gel,
    d. thereby removing said serum from said blade, and
    e. depositing the resulting removed serum in the slit formed in said gel by said blade, and
    f. removing said blade from said gel.

2. The method of inserting a serum specimen in a stabilizing media gel as described in claim 1, wherein:
    a. said serum specimen is coated along the blade edge surface on one side thereof,
    b. said coated blade edge surface is placed against the surface of said stabilizing media gel at an incline thereto and inserted into same, forming said slit therein,
    c. said coated blade surface within said stabilizing media gel is moved back and forth displacing said serum specimen from said blade edge surface, and
    d. said blade edge surface is removed from said stabilizing media gel free of said serum specimen.

3. The method of inserting a serum specimen in a stabilizing media gel as described in claim 2, wherein:
    a. said serum specimen is spread substantially thereacross said blade edge surface from a dispensing means,
    b. said coated blade edge surface inserted in said stabilizing media gel is pivoted in a back and forth motion about said blade edge surface, and
    c. said blade edge surface is removed from said stabilizing media gel generally perpendicular to said surface thereof.

4. The method of inserting a serum specimen in a stabilizing media gel as described in claim 1, wherein:
    a. said stabilizing media gel is supported on a sheet member in a relatively thin coating, and
    b. said stabilizing media gel is an agar gel material inert to the plastic material of the sheet member.

* * * * *